Aug. 22, 1967  G. PEENE  3,336,744
REINFORCING CORD HAVING TWO-FILAMENT CORE
SURROUNDED BY SIX SINGLE FILAMENT UNITS
Filed March 1, 1965

*INVENTOR.*
Guido Peene

*by* Sparrow and Sparrow

ATTORNEYS.

United States Patent Office 3,336,744
Patented Aug. 22, 1967

3,336,744
REINFORCING CORD HAVING TWO-FILAMENT CORE SURROUNDED BY SIX SINGLE FILAMENT UNITS
Guido Peene, Zwevegem, Belgium, assignor to Trefileries Leon Bekaert S.p.r.l., Zwevegem, Belgium
Filed Mar. 1, 1965, Ser. No. 435,921
Claims priority, application Belgium, Oct. 28, 1964, 4,636, Patent 654,920
18 Claims. (Cl. 57—145)

ABSTRACT OF THE DISCLOSURE

A metallic cord for use in reinforcing articles made of rubber, plastic or the like comprising a center core consisting of two metallic wires of equal diameter. Six metallic wires are disposed around the core forming a jacket. Each of these jacket wires has a diameter which is equal to substantially double the diameter of one of the core wires. One or more metallic or nonmetallic filaments may be laid in spiral fashion around the cable to improve the anchoring to the surrounding material.

---

This invention relates to cords adapted to be used for reinforcing articles made of rubber or of plastic, particularly for pneumatic tires, conveyor belts, power transmission belts, hoses for high pressure and the like.

The invention consists in such novel features, construction arrangements and improvements as may be shown and described in connection with the cord or cable herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

Known cord constructions for the aforementioned purposes are composed of a center core consisting of three wires having the same diameters and an outer jacket consisting of six identical units or strands each of which consists of three wires having the same diameters as the diameters of the wires composing the core. Cords of this kind, also known as cables, are frequently used for reinforcing rubber tires, as well as for other applications; they have a high fatigue resistance value but such high value is not always required, as for example in the tire breakers where rather a greater rigidity or stiffness is desired which cannot be provided by the described convential cable construction. Furthermore, the stranding of the wires causes inevitably a certain loss of tensile strength of the cable. The cost of such cable is relatively high because of the use of individual wire filaments having small diameters, and further because of the various steps which have to be performed in manufacturing such cable-cord. The cord of this invention does not have the heretofore-mentioned disadvantages.

It is intended by the present invention to overcome the aforementioned shortcomings. To this purpose the cord or cable, although derived from the utilization of a core surrounded by six units, does not embody the aforementioned disadvantages. In the cord or cable, according to the invention, each of the outer stranded units, which comprise the jacket, is replaced by a single filament or wire having the same diameter as the outer stranded unit, as in the cord or cable disclosed in U.S. Patent No. 3,032,963, but an essential feature which distinguishes the present invention from the disclosure in said patent is the replacement or substitution for the core unit of said patent of a core unit consisting of two filaments or wires, thus considerably improving the penetration of the rubber or plastic between center core and outer jacket when the cord or cable is being used for reinforcement purposes.

It is an object of the present invention to provide an improved construction of a cable or cord which has a greater amount of steel per unit of length for the same diameter as the conventional cable, resulting in an increased weight of the cord and in a proportionately increased tensile strength.

It is a further object of the present invention to provide a metallic cord with an improved tensile strength brought about by the substitution of single wire filament units for the stranded units in the outer jacket.

Furthermore, it is an object of the present invention to provide a cord for reinforcing articles made of rubber, plastic and the like materials which, because of the space provided between center core and outer jacket, permits an improved penetration of the rubber or plastic in which the cord is embedded, which results in greater cohesion and higher fatigue resistance value.

Another object of the present invention is to provide for a cord of the kind described, that is manufactured more economically than conventional cords.

Various further and more specific purposes, features and advantages will clearly appear from the detailed description given below taken in connection with the accompanying drawing which forms part of this specification and illustrates merely by way of example one embodiment of the device of the invention. In the following description and in the claims, parts will be identified by specific names for convenience, but such names are intended to be as generic in their application to similar parts as the art will permit. Like reference characters denote like parts in the figures of the drawing, in which:

Figure 1:
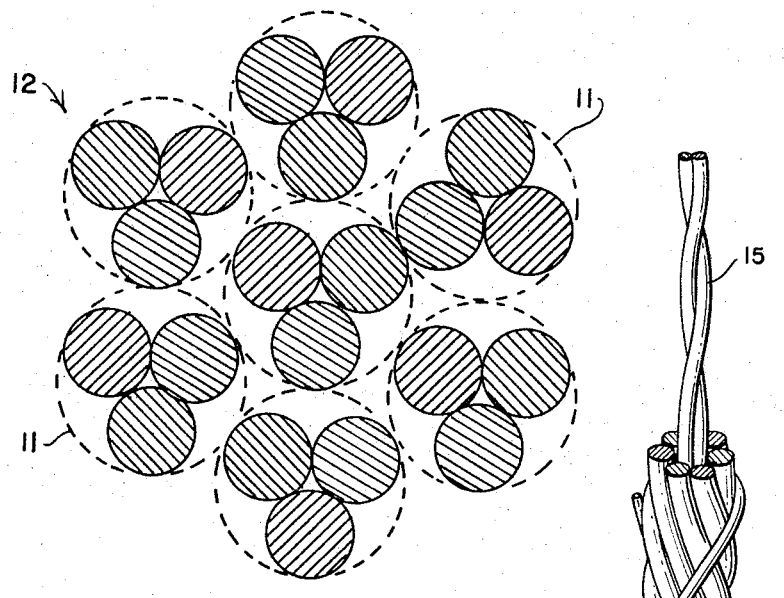
FIG. 1 shows the cross-section of a conventional cord or cable.
Figure 2:
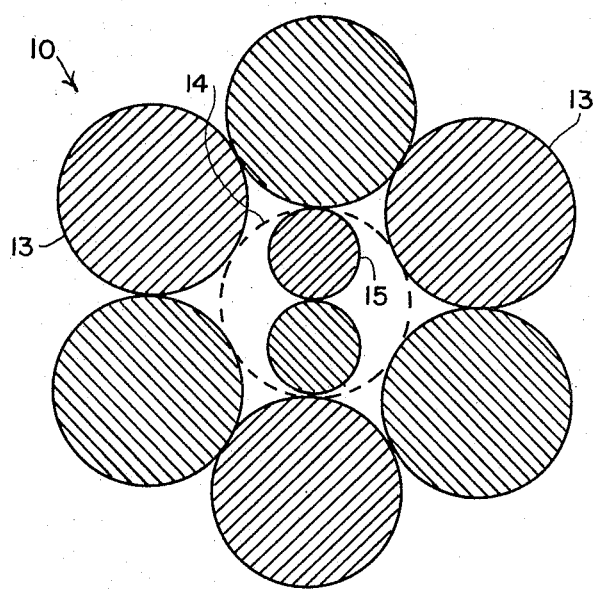
FIG. 2 shows the cross-section of the improved cable or cord, according to the invention.

Referring now in more detail to the drawing illustrating a preferred embodiment by which the invention may be realized, there is shown in FIG. 2 in cross-section a cable or cord 10 in which the outer strand units 11 (each of which consists of three wires or filaments) of a conventional cable 12, such as is shown in FIG. 1, are replaced with units 13, each of which consists of a single wire or filament. The six outer units in each of FIGS. 1 and 2 constitute the jacket of the cord or cable. The diameter of each one of these single wires composing units 13 is the same, and is substantially equal to the diameter of each one of the outer strand units 11, consisting of the three wires. Whereas the center or core unit in FIG. 1 consists of three wires of equal diameter, the center or core unit in FIG. 2 is composed of only two wires 15 of equal diameters. The outside diameter of stranded core 14 is equal to the diameters of wires 13.

For typical compositions of cables of the type according to the invention, those having the following dimensions may be considered:

For heavier cables: a core unit consisting of two wires, each wire having a diameter of 0.20 mm. surrounded by a jacket composed of six units, each unit consisting of one wire having a diameter of 0.38 mm..

For finer cables: a core unit consisting of two wires, each wire having a diameter of 0.15 mm., surrounded by a jacket composed of six units, each unit consisting of one wire having a diameter of 0.27 mm.

This structure improves considerably the cohesion and penetration of the rubber or the plastic (whichever the case may be) between center core 14 and the jacket composed of the outer single wire units 13, and provides a higher fatigue resistance value. Moreover, the increase of the average diameter of the individual component monofilament of an outer unit of the jacket from approximately one-ninth of the overall diameter of the cable to between substantially one-half to one-third of this overall diameter, and the absence of stranded filaments in the outer jacket of the cable causes desired greater stiffness, increased amount of steel per unit of length for the same diameter as conventional cables and, thus, increased weight and tensile strength of the cable. It is obvious that such cable is less expensive to manufacture and brings about considerable improvement of the Economic Coefficient, that is, proportion of cost per meter length to tensile strength in kilograms.

Figure 3:
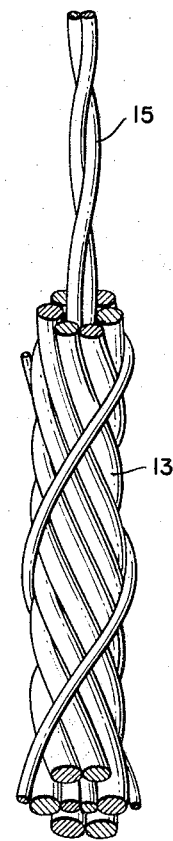
FIG. 3 shows the core according to the invention, having two filaments spirally wound around the same.

The pitch of the cabling, both of inner core strands and of outer jacket can be varied within fairly reasonable limits, for either concurrent, cross or intermittent lay. The individual component wires, if made of steel, can be plated with nonferrous metals or may be covered with plastic, organic, ceramic or other non-metallic coatings for protection against corrosion or against chemical attack by sulphurous or other deleterious residues remaining from vulcanization. Any combination of the individual component filaments or monofilaments may be made of metal and suitable non-metal materials. It also is understood that one or more metallic or non-metallic filaments may be laid in spiral fashion around the cable for improved anchoring of the same in the surrounding rubber, plastic or the like material (see FIG. 3).

While the invention has been described and illustrated with respect to a certain preferred example which gives satisfactory results, it will be understood by those skilled in the art after understanding the principle of the invention that various other changes and modifications may be made without departing from the spirit and scope of the invention and it is intended in the appended claims to cover all such changes and modifications.

I claim:
1. Metallic cord for reinforcing articles made of rubber, plastic or like materials, comprising a center core consisting of two metallic wires having equal diameters, and six metallic wires having equal diameters disposed around said core constituting a jacket, each of said jacket wires having a diameter which is equal to substantially double the diameter of one of said core wires.

2. Metallic cord according to claim 1, and at least some of said wires having a metallic coating.

3. Metallic cord according to claim 1, and at least some of said wires having a non-metallic coating.

4. Metallic cord according to claim 1, and said jacket including at least one metallic helical element disposed around said six wires.

5. Metallic cord according to claim 1, and said jacket including at least one non-metallic helical element disposed around said six wires.

6. Metallic cord according to claim 1, at least some of said wires having a metallic coating, and said jacket including at least one helical element disposed around said six wires.

7. Metallic cord according to claim 1, at least some of said wires having a non-metallic coating, and said jacket including at least one helical element disposed around said six wires.

8. Cord for reinforcing an article comprising a center core consisting of two filaments having substantially equal diameters, and six filaments having substantially equal diameters disposed around said core constituting a jacket, each of said jacket filaments having a diameter of substantially 1.7 to 2.0 times the diameter of one of said core filaments.

9. Cord for reinforcing an article according to claim 8, and at least some of said wires having a metallic coating.

10. Cord for reinforcing an article according to claim 8, and at least some of said wires having a non-metallic coating.

11. Cord for reinforcing an article according to claim 8, and said jacket including at least one metallic helical element disposed around said six wires.

12. Cord for reinforcing an article according to claim 8, and said jacket including at least one non-metallic helical element disposed around said six wires.

13. Cord for reinforcing an article according to claim 8, at least some of said wires having a metallic coating, and said jacket including at least one helical element disposed around said six wires.

14. Cord for reinforcing an article according to claim 8, at least some of said wires having a non-metallic coating, and said jacket including at least one helical element disposed around said six wires.

15. As an article of manufacture of body consisting of rubber, plastic or like material, at least one cord embedded in said body, said cord comprising a center core consisting of two filaments having substantially equal diameters, and six filaments having substantially equal diameters disposed around said core constituting a jacket, each of said jacket filaments having a diameter of substantially 1.7 to 2.0 times the diameter of one of said core filaments.

16. As an article of manufacture a body consisting of rubber, plastic or like material, at least one cord embedded in said body, said cord comprising a center core consisting of two metallic wires having equal diameters, and six metallic wires having equal diameters disposed around said core constituting a jacket, each of said jacket wires having a diameter which is equal to substantially double the diameter of one of said core wires.

17. As an article of manufacture a body consisting of rubber, plastic or like material, at least one cord embedded in said body, said cord comprising a center core consisting of two metallic wires having equal diameters, and six metallic wires having equal diameters disposed around said core constituting a jacket, each of said jacket wires having a diameter which is equal to substantially double the diameter of one of said core wires, at least some of said wires having a metallic coating, and said jacket including at least one helical element disposed around said six wires.

18. As an article of manufacture a body consisting of rubber, plastic or like material, at least one cord embedded in said body, said cord comprising a center core consisting of two metallic wires having equal diameters, and six metallic wires having equal diameters disposed around said core constituting a jacket, each of said jacket wires having a diameter which is equal to substantially double the diameter of one of said core wires, at least some of said wires having a non-metallic coating, and said jacket including at least one helical element disposed around said six wires.

References Cited
UNITED STATES PATENTS

| | | | |
|---|---|---|---|
| 1,759,410 | 5/1930 | Marston | 57—152 X |
| 2,041,812 | 5/1936 | Bouget et al. | 57—146 X |
| 2,067,405 | 1/1937 | Mayne | 57—149 X |
| 2,277,145 | 3/1942 | Pierce | 57—149 X |
| 2,598,033 | 5/1952 | Bourdon | 57—144 |
| 2,605,201 | 7/1952 | Howe | 57—144 X |
| 3,032,963 | 5/1962 | Fenner | 57—149 X |
| 3,273,978 | 9/1966 | Paul | 57—149 X |

FRANK J. COHEN, Primary Examiner.

D. E. WATKINS, Examiner.